(12) United States Patent
Stephens et al.

(10) Patent No.: US 7,401,542 B2
(45) Date of Patent: Jul. 22, 2008

US007401542B2

(54) ADJUSTABLE HYDRAULIC METERING SYSTEM

(75) Inventors: Joshua J Stephens, Cuba City, WI (US); Leonard K Mast, Platteville, WI (US)

(73) Assignee: Deere & Company, Moline, IL (US)

( * ) Notice: Subject to any disclaimer, the term of this patent is extended or adjusted under 35 U.S.C. 154(b) by 177 days.

(21) Appl. No.: 11/363,615

(22) Filed: Feb. 28, 2006

(65) Prior Publication Data

US 2007/0199439 A1 Aug. 30, 2007

(51) Int. Cl.
*G05G 1/04* (2006.01)
*A01B 63/00* (2006.01)

(52) U.S. Cl. ........................................ 91/525; 74/479.01

(58) Field of Classification Search .................. 91/525; 74/479.01, 491
See application file for complete search history.

(56) References Cited

U.S. PATENT DOCUMENTS 2,787,746 A * 4/1957 Redmond .................... 74/491
4,553,448 A * 11/1985 Youngers et al. ......... 74/479.01
5,110,253 A 5/1992 Ernst et al.
5,455,769 A * 10/1995 Panoushek et al. ............ 701/50
6,550,562 B2 * 4/2003 Brandt et al. .......... 74/471 XY
6,561,076 B2 * 5/2003 Hou et al. ...................... 91/443
6,571,902 B2 * 6/2003 Heyne et al. .................. 74/491
6,732,512 B2 5/2004 Pfaff et al.
6,892,481 B2 * 5/2005 Yamamoto et al. ............ 37/348

OTHER PUBLICATIONS

John Deere, Construction Equipment Division, Model No. 410G, DKA410G Litho in USA (Jan. 2003) pp. 1-16.

John Deere, 330C LC 370C, DKAX330CLC, pp. 10-16, Litho in USA date unknown.

* cited by examiner

*Primary Examiner*—Thomas E Lazo
(74) *Attorney, Agent, or Firm*—Baker & Daniels LLP

(57) ABSTRACT

A vehicle is disclosed having a hydraulic control system with a user input to select a range of metering rates.

33 Claims, 6 Drawing Sheets

ADJUSTABLE HYDRAULIC METERING SYSTEM

BACKGROUND OF THE INVENTION

The present invention relates generally to hydraulic control systems. More particularly, the present invention relates to a hydraulic control system that provides metering rates for a hydraulic device.

BACKGROUND AND SUMMARY

Many pieces of construction equipment use hydraulics to control the functions performed by the equipment. The operator is provided with one or more input devices operably coupled to one or more hydraulic actuators which manipulate the relative location of various components or devices of the equipment to perform various operations. For example, backhoes often have a plurality of control levers and/or foot pedals to control various functions of a backhoe, such as a position of a boom arm, a position of a dipperstick arm coupled to the boom arm, and a position of a bucket coupled to a dipperstick arm.

Further, the magnitude of movement of an input device, such as a control lever, generally controls the rate of movement of a given device, such as a dipperstick arm on a backhoe. However, it is difficult to provide a wide enough range of movement within a travel range of the given input device to encompass all desired resolutions of movement rates for the given device. Some operations require precision movement of a given device, such as digging around a pipe with a backhoe. Under such circumstances, it is desirable to control the speed that the tip of the bucket of the backhoe moves relative to the material being moved. Such operations would be aided with a smaller range of movement rates of the device having a higher resolution. Other operations do not require precision movement of a given device, such as moving a bucket full of dirt from the above digging operation to a truck or pile. Such operations would be better served by having a larger range of movement rates of the device having a lower resolution. The range of movement rates of a device is generally dependent on a range of metering rates of a hydraulic value or hydraulic pump associated with a hydraulic actuator of the device.

In an exemplary embodiment of the present invention, the ability to select from a plurality of ranges of metering rates for a hydraulic system is provided. The plurality of ranges of metering rates includes a first range of metering rates providing an appropriate resolution of movement rates of an output device for a first operation and a second range of metering rates providing an appropriate resolution of movement rates of the output device for a second operation without requiring the operator to let go of an input device that is controlling the movement of the device.

In another exemplary embodiment of the present invention, a vehicle is provided. The vehicle comprising: a frame; a plurality of traction devices configured to propel the frame on the ground; an output device coupled to the frame, the output device configured to be moveable between a first position and a second position; a hydraulic actuator coupled to the output device to move the output device between the first position and the second position; and a hydraulic control system coupled to the hydraulic actuator and configured to provide hydraulic fluid to the hydraulic actuator. The hydraulic control system includes a base member having a range of travel. The range of travel corresponds to a range of metering rates of hydraulic fluid to the hydraulic actuator. The system further includes an input device coupled to the base member and being adjustable by an operator while the operator holds the base member. The input device has a first position which corresponds to the range of metering rates being set to a first range of metering rates and a second position which corresponds to the range of metering rates being set to a second range of metering rates. The second range of metering rates is greater than the first range of metering rates.

In a further exemplary embodiment of the present invention, a vehicle is provided. The vehicle includes: a frame; a plurality of traction devices configured to propel the frame on the ground; and an output device coupled to the frame. The output device is configured to perform a first function and to perform a second function. The vehicle further includes a first hydraulic actuator coupled to the output device to move the output device during the performance of the first function; a second hydraulic actuator coupled to the output device to move the output during the performance of the second function; and a hydraulic control system coupled to the first hydraulic actuator and the second hydraulic actuator and configured to provide hydraulic fluid to the first hydraulic actuator and the second hydraulic actuator. The hydraulic control system includes a first user input device configured to be held by a first hand of the operator and to control the first function of the output device. The first user input has a first range of metering rates. The system further includes a second user input device configured to be held by a second hand of the operator and to control the second function of the output device. The second user input device has a second range of metering rates. The system further includes a third user input device positioned to be adjustable by the operator while the operator holds the first user input device and the second user input device. The third user input device is configured to adjust at least one of the first range of metering rates and the second range of metering rates.

In still a further exemplary embodiment of the present invention, a method of controlling a metering rate of a hydraulic system of a vehicle which controls the operation of an output device is provided. The method includes the steps of: holding a first user input device of the vehicle with a first hand to control a first function of the output device and holding a second user input device of the vehicle with a second hand to control a second function of the output device. The first function has a first range of metering rates. The section has a second range of metering rates. The method further includes the step of adjusting at least one of the first range of metering rates the second function has a second range of metering rates; and the second range of metering rates while continuing to hold the first user input device and the second user input device.

In yet another exemplary embodiment of the present invention, a vehicle is provided. The vehicle includes: a frame; a plurality of traction devices configured to propel the frame on the ground; and an output device coupled to the frame. The output device is configured to be moveable between a first position and a second position. The vehicle further includes a hydraulic actuator coupled to the output device to move the output device between the first position and the second position and a hydraulic control system coupled to the hydraulic actuator and configured to provide hydraulic fluid to the hydraulic actuator. The hydraulic control system includes a first user input device having a default position and a range of travel from the default position. The range of travel corresponds to a range of metering rates of hydraulic fluid to the hydraulic actuator. The system further includes a second user input device having a first position and a second position. The second user input device is adjustable by the operator while holding the first user input device. The control system sets the range of metering rates to a first range of metering rates corresponding to the second user input device being in the first position and sets the range of metering rates to a second range of metering rates corresponding to the second user input device being in the second position.

Additional features of the present invention will become apparent to those skilled in the art upon consideration of the following detailed description of the presently perceived best mode of carrying out the invention.

BRIEF DESCRIPTION OF THE DRAWINGS

The detailed description of the drawings particularly refers to the accompanying figures in which.

DETAILED DESCRIPTION OF THE DRAWINGS

Figure 1:
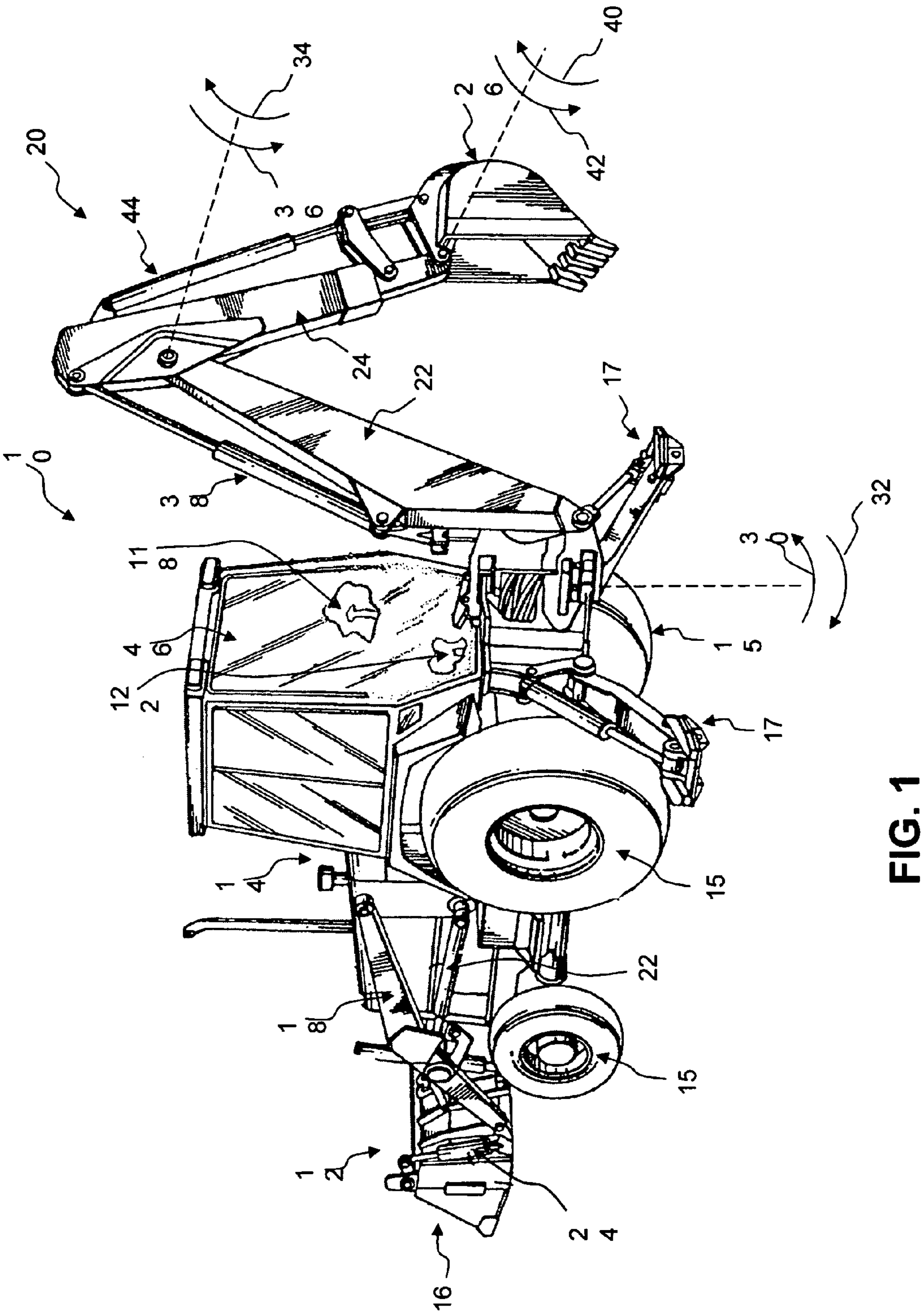
FIG. 1 is an exemplary vehicle.

A vehicle, illustratively a backhoe loader, 10 is shown in FIG. 1. Vehicle 10 is able to perform many different operations relative to the movement of dirt or other materials. For example, a loader 12 which is coupled to a frame 14 of vehicle 10 may carry materials in a bucket 16 which is coupled to support arms 18. Support arms 18 and bucket 16 may be raised or lowered relative to frame 14 through hydraulic actuators 22 (only one shown) and bucket 16 may be moved relative to support arms 18 by hydraulic actuators 24 (only one shown).

Further, a backhoe 20 of vehicle 10 may be used to dig trenches and move material through the movement of a boom arm 22, a dipperstick arm 24, and a bucket 26. Bucket 26 is moveably coupled to dipperstick arm 24, which is moveably coupled to boom arm 22 which is moveably coupled to frame 14. Boom arm 22 is rotatable relative to frame 14 in directions 30, 32. The rotation of boom arm 22 in directions 30, 32 being controlled by hydraulic actuators (not shown). Dipperstick arm 24 is rotatable relative to boom arm 22 in directions 34, 36. The rotation of dipperstick arm 24 relative to boom arm 22 in directions 34, 36 being controlled by a hydraulic actuator 38. Bucket 26 is rotatable relative to dipperstick arm 24 in directions 40, 42. The rotation of bucket 26 relative to dipperstick arm 24 in directions 40, 42 is controlled by a hydraulic actuator 44.

Figure 6:
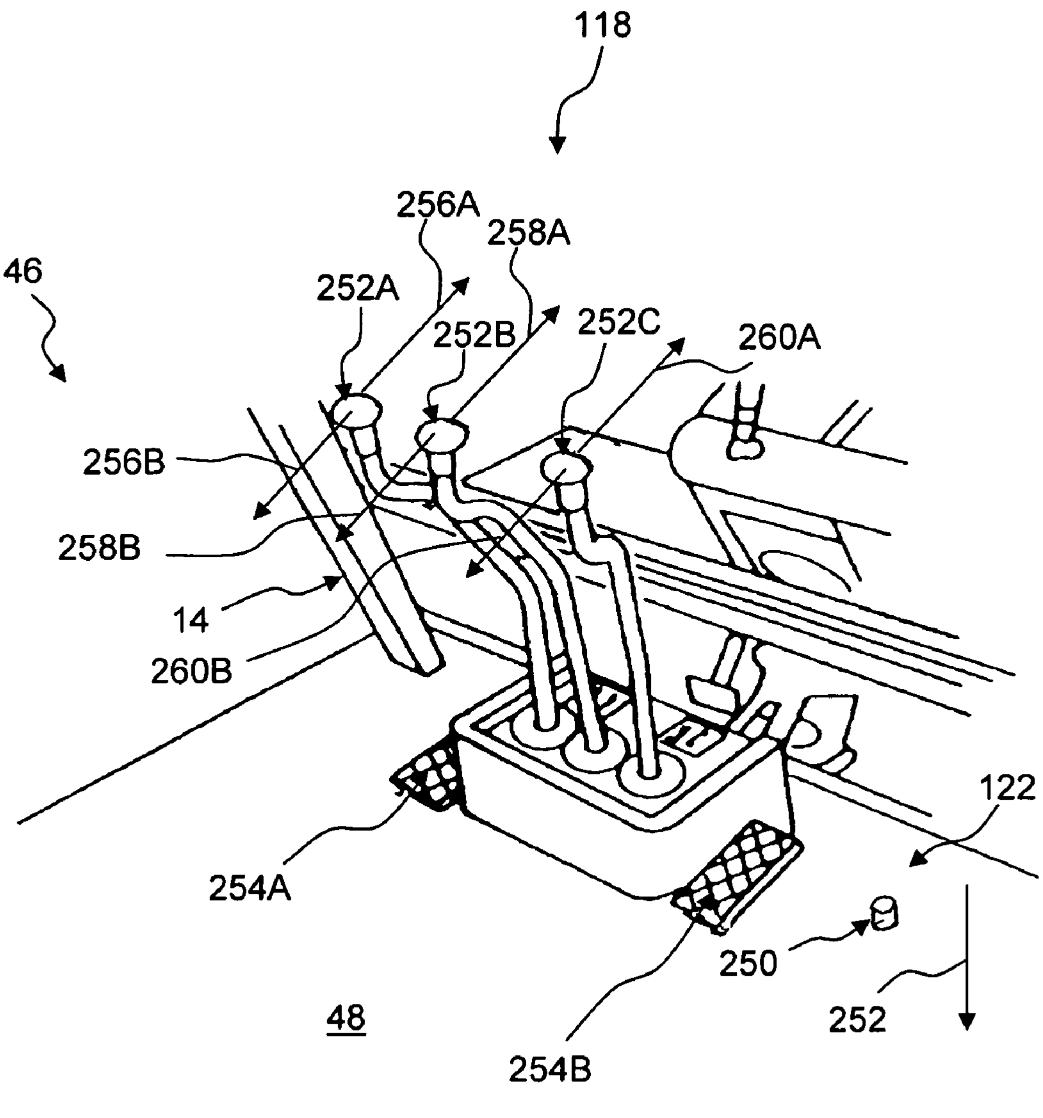
FIG. 6 is a perspective view of a plurality of exemplary operator input devices and a third exemplary metering gain operator input device spaced apart from the plurality of exemplary operator input devices.

Frame 14 may be moved about by a plurality of traction devices 15. Further, frame 14 may be stabilized by a plurality of stabilizer arms 17. Loader 12, backhoe 20, and the movement of vehicle 10 is controlled by an operator positioned within an operator compartment or cab 46. Although operator compartment is shown as an enclosed compartment, operator compartment 46 may be open or partially enclosed. As best shown in FIG. 6, operator compartment 46 includes a floor 48. One exemplary backhoe loader is the Model No. 410G available from Deere & Company whose World Headquarters are located at One John Deere Place, Moline, Ill. 61265.

Each of hydraulic actuators 22, 24, 38, and 44 are illustratively shown as hydraulic cylinders wherein a length of the given hydraulic cylinder is adjustable by the introduction of and/or removal of hydraulic fluid to a respective side of a piston within the hydraulic cylinder as is known in the art. Further, the rate at which a length of the given hydraulic cylinder may be lengthened or shortened is determined by the rate hydraulic fluid which is introduced or removed from a respective side of the piston. The rate at which hydraulic fluid is introduced or removed from a respective side of the piston is governed by a hydraulic control system which controls a metering rate of a valve associated with the respective hydraulic actuator and/or a metering rate of a pump associated with the hydraulic actuator.

Although a backhoe loader is illustratively shown as an exemplary vehicle 10, the hydraulic control system 100 disclosed herein may be used with other suitable vehicles or equipment, such as graders, bulldozers, hoists, compactors, and jack hammers and their respective devices, such as a grader blade for a grader. In one example, a high resolution range of metering rates is used for grading with a grader and a low resolution range of metering rates is used for lifting a grader blade of the grader.

Figure 2:
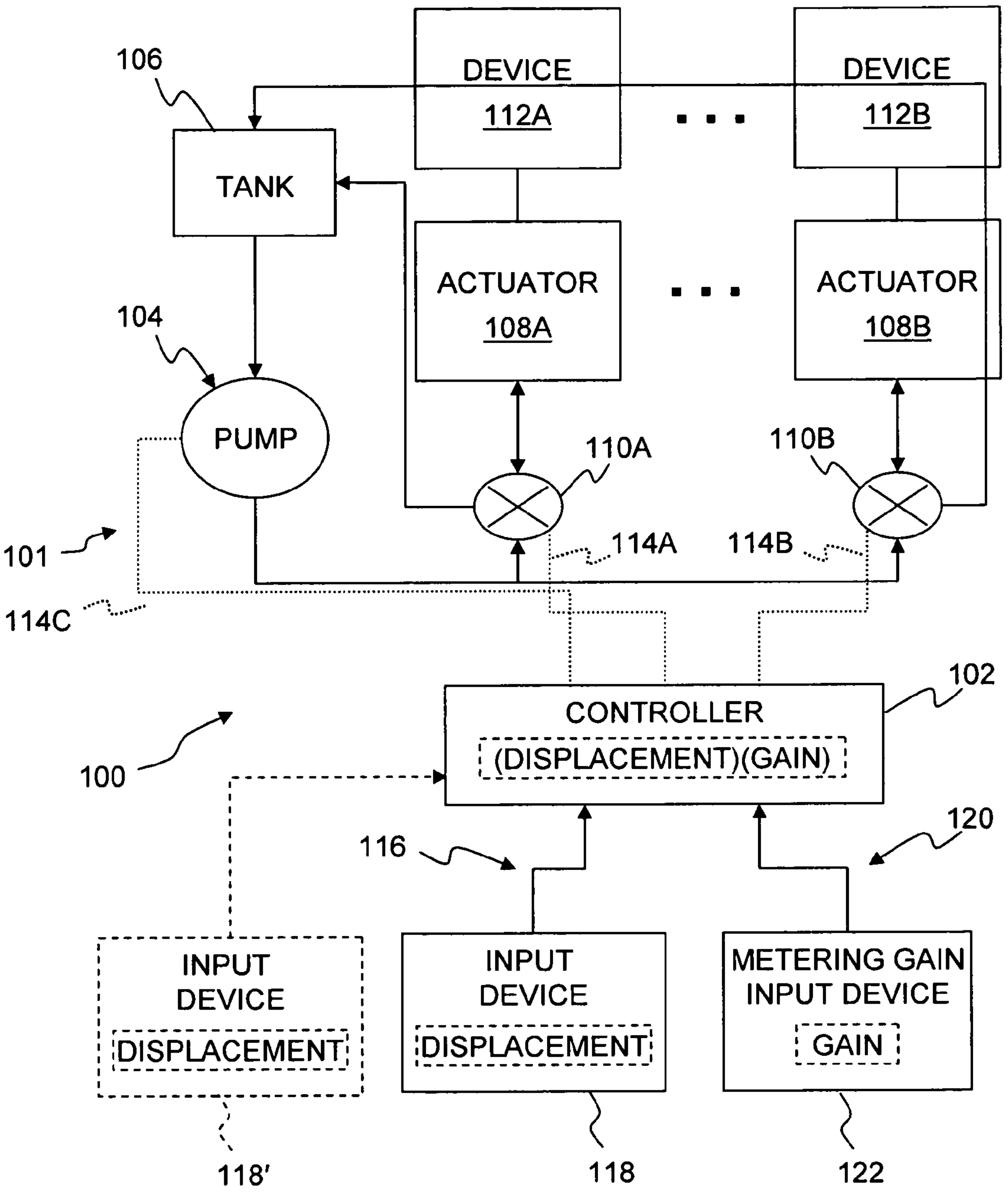
FIG. 2 is a representative view of an exemplary hydraulic control system for controlling at least a first output device of a hydraulic system of the vehicle of FIG. 1.

Referring to FIG. 2, an exemplary hydraulic control system 100 is represented. Hydraulic control system 100 may be an electrical control system, a mechanical control system, or an electromechanical control system. In one embodiment, hydraulic control system 100 includes a controller 102 that receives inputs from various sources and provides commands or other outputs to various components of vehicle 10, such as hydraulic actuators 22, 24, 38, and 44, based on logic stored in controller 102 and the received inputs.

Hydraulic control system 100 is operably coupled to a hydraulic system 101 which includes a pressure source or hydraulic pump 104 that pressurizes the hydraulic fluid and provides the hydraulic fluid to a hydraulic actuator, illustratively actuators 108A and 108B, through one or more valves, illustratively valves 110A and 110B. Actuators 108A and 108B may be similar to actuators 22, 24, 38, and 44 or may be any other suitable type of hydraulic actuator known to one of ordinary skill in the art. Hydraulic system 101 further includes a hydraulic fluid tank 106 that receives hydraulic fluid back from actuators 108A and 108B through valves 110A and 110B.

Each of actuators 108A and 108B controls the operation of a respective output device 110A and 110B. Exemplary output devices include boom arm 22, dipperstick arm 24, bucket 26, bucket 16, and support arms 18 of vehicle 10. Other exemplary output devices include a grader blade on a grader vehicle. In one embodiment, actuators 108A and 108B both control the same output device 110. One example is the raising of support arms 18 which includes an actuator 22 for each of the two support arms 18 (only one shown). In another embodiment, actuators 108A and 108B control separate output devices 112A and 112B. One example is wherein actuator 108A controls the raising and lowering of dipperstick 24 and actuator 108B controls the movement of bucket 26.

In the illustrated embodiment, each of actuators 108A and 108B has an associated valve 110A and 110B, respectively. Valves 110A and 110B control the metering rate of hydraulic fluid from pump 104 to the respective actuator 108A and 108B and the metering rate of hydraulic fluid from the respective actuator 108A and 108B to fluid reservoir 106. In one embodiment, valves are controlled by controller 102 through a solenoid valve. In another embodiment, valves 110A and 110B are controlled hydraulically by controller 102.

Hydraulic control system 100 is operably coupled to pump 104 and valves 110A and 110B as represented by dashed lines 114A, 114B, and 114C. By adjusting a metering rate of pump 104 and/or adjusting the metering rates of valves 110A and 110B, the rate of movement of the respective actuator 108A and 108B and hence output devices 112A and 112B may be adjusted by hydraulic control system 100.

Hydraulic control system 100 receives input signals from an operator which indicate a desired position and/or movement speed of one or more of devices 112. These input signals may be generated by a plurality of operator input devices.

For illustrative purposes, control system 100 is shown receiving a first input signal 116 from a first operator input device 118 and a second input signal 120 from a second operator input device 122. In the illustrated embodiment, operator input device 118 provides an indication (a hydraulic or electric signal 116) of the desired rate of movement of the respective output device 112A or 112B. Exemplary operator input devices 118 include a lever, a joystick, a foot pedal, or other suitable operator input device which may be displaced by the operator.

Operator input device 118 has a defined range of travel in one or more directions from a default position and that the movement of operator input device 118 from a default position provides an indication of the desired rate of movement of device 102A. Generally, the default position of operator input device 118 corresponds to a zero rate of movement and a displacement of operator input device to the extent of the range of travel in a first direction ("extreme position") corresponds to a rate of movement of "x" m/s. Displacements of operator input device between the default position and the extreme position result in a rate of movement between zero and x. Therefore, the magnitude of the displacement of operator input device 118 from a default position provides an indication of the desired rate of movement of device 102A.

The rate of movement of output device 112A is dependent upon the metering rate of associated valve 110A. If valve 110A is configured to provide a higher metering rate of hydraulic fluid to pass to or from hydraulic actuator 108A, hydraulic actuator 108A may more quickly move output device 112A. If valve 110A is configured to provide a lower metering rate of hydraulic fluid to pass to or from hydraulic actuator 108A, hydraulic actuator 108A will take longer to move output device 112A. As such, the movement rate of output device 112A is dependent upon the metering rate of valve 110A.

However, it should be noted that the rate of movement of output device 112A is also dependent on the configuration of equipment 100. For instance, in the case of backhoe loader 10, the rate of movement of bucket 26 depends at least on the geometry and position of boom arm 22 and the metering speed of valve 110A. Further, it should be understood that the range of potential metering rates of valve 110A are bounded by the hydraulic capacity of hydraulic system 101.

As explained herein various operations require differing ranges of rates of movement of device 102A to optimize the use of equipment 100. For instance, certain operations, such as digging in close proximity to a pipe with a backhoe, require precision or fine control over the movement of the components of a backhoe. As such, a high resolution of movement rates of the respective components would be desired. In another instance, such as moving dirt to a truck for removal, it is desired to provide a higher rate of movement of the components of the backhoe to reduce cycle times. As such, a lower resolution or gross resolution of movement rates would be desired.

Although the rate of movement of device 112A may be controlled by the magnitude of displacement of operator input device 118 from a default position, as stated above the range of rates of movement of output device 112A is bounded by the length of travel of operator input device 118 from the default position. Further, as stated above the range of movement rates of output device 112A is governed by the metering rate of valve 110A. Operator input device 122 compensates for this limited range of movement of operator input device 118 by adjusting the overall range associated with the range of movements. Exemplary operator input devices 122 include a lever, a joystick, a foot pedal, a knob, a thumb wheel, a button, or other suitable operator input device which may be adjusted by the operator.

Figure 3:
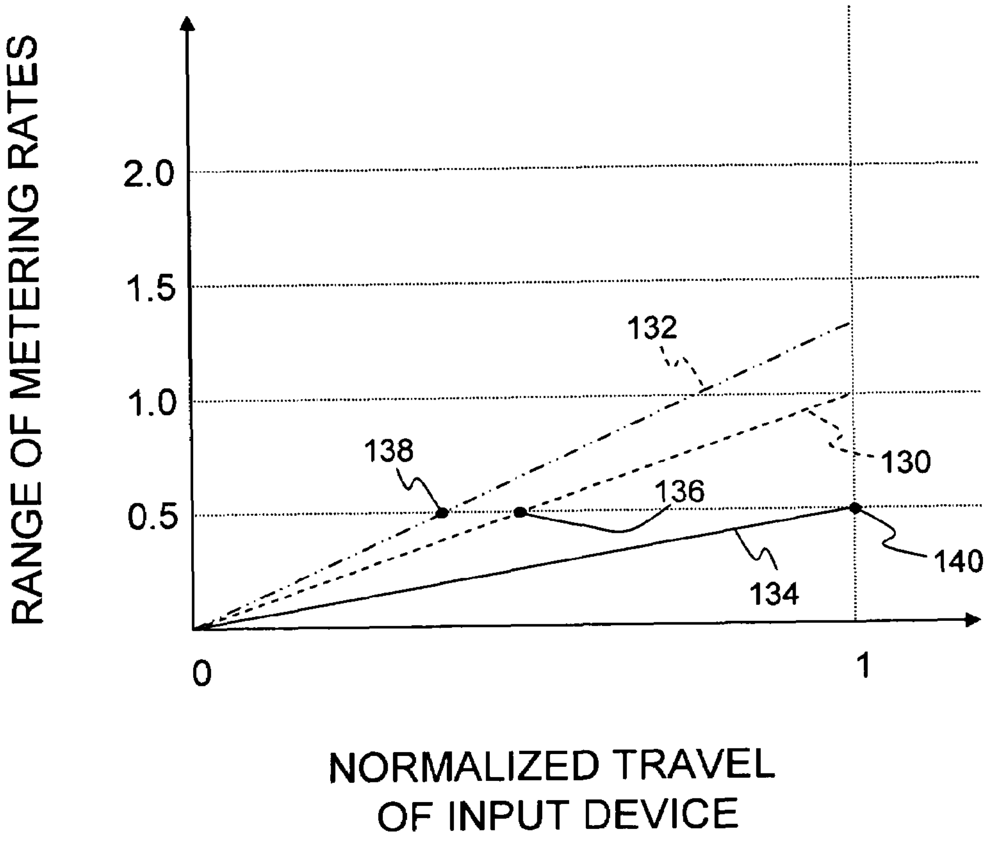
FIG. 3 is a representative graph illustrating the range of metering rates of an exemplary valve as a function of a first operator input device travel for three illustrative metering gains selected with a second operator input device.

Referring to FIG. 3, three illustrative range of metering rates of valve 110A are shown as a function of the travel of operator input device 118 in a first direction. Each range of metering rates is shown as being generally linear for illustrative purposes. However, each range of metering rates may be non-linear. Each of metering rate curves 130, 132, 134 has a zero metering rate corresponding to operator input device 118 being in a default or zero position.

Metering rate curve 130 has a metering rate of 1.0 (for illustrative purposes) at the full travel position of operator input device 118. Metering rate curve 132 has a metering rate of 1.3 (for illustrative purposes) at the full travel position of operator input device 118. As such, the range of metering rates for curve 132 is higher than the range of metering rates for curve 130. As illustrated in the graph by points 136 and 138, this translates into a given metering rate being achieved at a smaller displacement of operator input device 118 for curve 132 than for curve 130. Therefore, curve 132 may be characterized as having a lower resolution than curve 130 and being preferred for gross operations with output device 112A. The range of metering rates for curve 132 is about 130% (or has a gain of about 1.3) of the range of metering rates for curve 130. In one embodiment, the range of metering rates for a gross operation (illustratively curve 132) with output device 112A is about 110% to about 130% of the range of metering rates for a normal operation (illustratively curve 130) with output device 112A.

Metering rate curve 134 has a metering rate of 0.5 (for illustrative purposes) at the full travel position of operator input device 118. As such, the range of metering rates for curve 134 is lower than the range of metering rates for curve 130. As illustrated in the graph by points 136 and 140 this translates into a given metering rate being achieved at a higher displacement of operator input device 118, illustratively full travel of operator input device 118 for curve 134 compared to curve 130. Therefore, curve 134 may be characterized as having a higher resolution than curve 130 and being preferred for precision operations with output device 112A. As such, the range of metering rates for curve 134 is about 50% (or has a gain of about 0.5) of the range of metering rates for curve 130. In one embodiment, the range of metering rates for a precision operation (illustratively curve 134) with output device 112A is about 50% of the range of metering rates for a normal operation (illustratively curve 130) with output device 112A.

Returning to FIG. 2, second input signal 120 from second operator input device 122 provides an indication of the range of metering rates desired for the respective output device 112A or 112B. Illustratively, second operator input device 122 provides a gain signal or indication to controller 102. In one embodiment, second operator input device 122 provides a plurality of discrete gains from which the operator may choose. In another embodiment, second operator input device 122 provides a generally infinite selection of gains from which the operator may choose.

Controller 102 provides a control signal to valve 110A based on the input of operator input device 118 and operator input device 122. Illustratively a displacement of operator input device 118 from its default position coupled with the setting of input 122 provides an indication of a desired movement rate for output device 112A. Based on these inputs, controller 102 sets a metering rate for valve 110A. As explained above in connection with FIG. 3, operator input device 122 provides a gain value to controller 102 to set the range of metering rates for valve 110A. In one embodiment, controller 102 has stored the range of metering rates for valve 110A for normal operation and this range is modified by the gain value of operator input device 122 to produce the desired range of metering rates for a given operation, such as a precision operation or a gross operation.

In one embodiment, second operator input device 122 has two discrete settings, a first setting corresponding to normal operation (gain=1) and a second setting corresponding to precision operation (gain<1). In another embodiment, second operator input device 122 has three discrete settings, a first setting corresponding to normal operation (gain=1), a second setting corresponding to precision operation (gain<1), and a third setting corresponding to gross operation (gain>1). In a further embodiment, second operator input device has a plurality of settings, including at least two settings for precision operation. In one example, second operator input device 122 has a variable gain, such as in the case of a infinitely adjustable operator input device 122.

As explained above, an exemplary precision operation is removing material from around a pipe and an exemplary gross operation is moving the material to a pile or truck. In the case of a backhoe, typically precision operations correspond to the filling of bucket 26 and gross operations correspond to the emptying of bucket 26. As may be seen, at least in the case of operating a backhoe, an operator will likely desire to make multiple selections between one or more precision ranges of metering rates and one or more normal or gross ranges of metering rates. Further, the operator may need to change the range of metering rates while the operator is holding one or more of operator input devices 118.

In one embodiment, more than one operator input device 118 is provided. In one example, operator input device 118 provides an indication to controller 102 to adjust the position of device 112A and operator input device 118' provides an indication to controller 102 to adjust the position of device 112B. In one embodiment, second user input 122 provides a global gain for both operator input device 118 and operator input device 118'. In another embodiment, second user input 122 provides a gain for one of operator input device 118 and operator input device 118' and the other of operator input device 118 and operator input device 118' has either a set gain or has a gain assigned by another operator input device 122. In one embodiment, an operator may select which operator input devices 118 or functions performed by operator input devices 118 that are adjustable by operator input device 122.

In one embodiment, to accommodate the desire to change the range of metering rates while holding onto one or more of operator input devices 118, second operator input device 122 is positioned to be adjusted by the operator while the operator is holding onto one or more operator input devices 118. Such placement permits the operator to change the range of metering rates and hence the movements rates of output device 112 on-the-fly.

Figure 4:
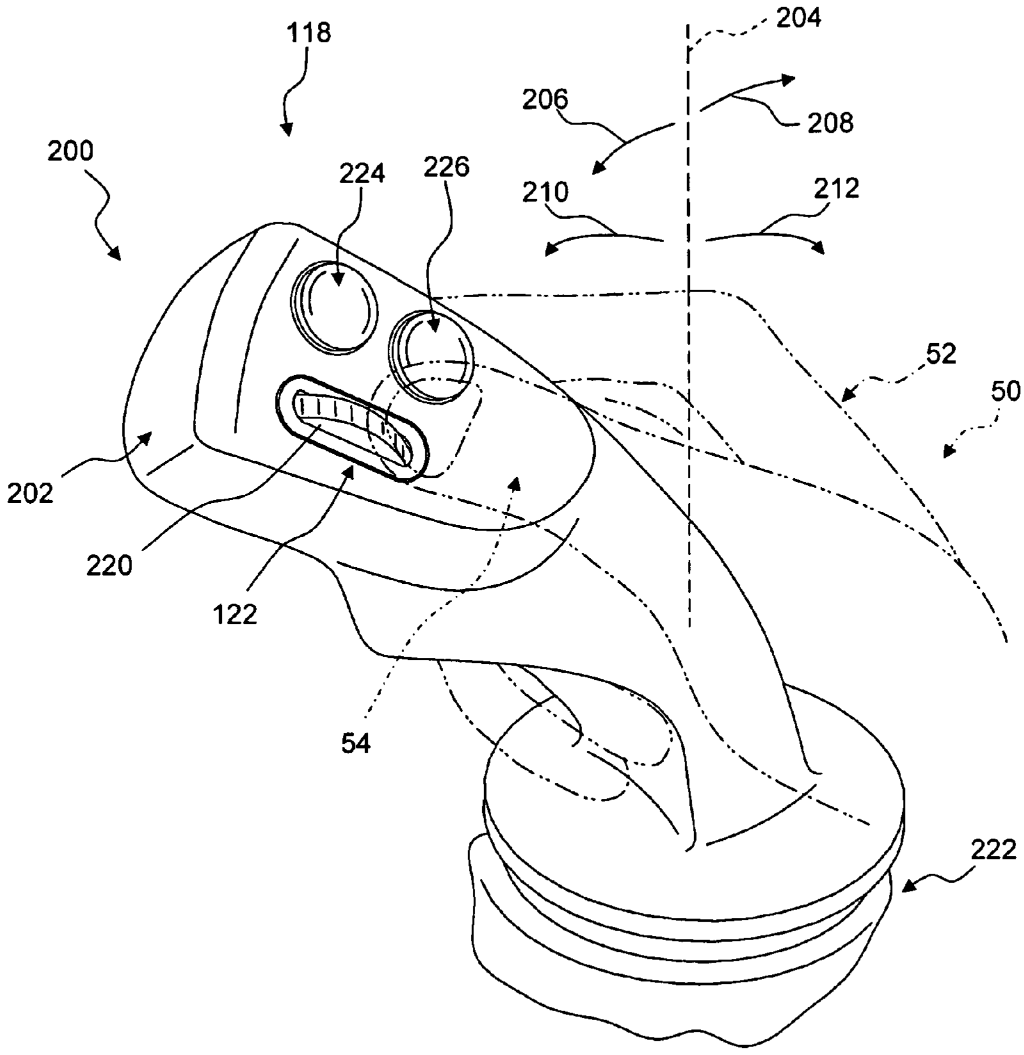
FIG. 4 is a perspective view of a first exemplary operator input device being held by a hand of the operator, the first exemplary operator input device including a rotatable metering gain operator input device.

Referring to FIG. 4, an exemplary operator input device 200 is shown. Operator input device 200 is a joystick which includes the functionality of operator input device 118 and operator input device 122. Joystick 200 includes a base member 202 which may be moved from a default position (indicated by dashed line 204) in directions 206 and 208. In one embodiment, joystick 200 provides an input to controller 102 for actuator 108A when moved in directions 206 or 208. In another embodiment, joystick 200 provides an input to controller 102 for actuator 108A when moved in directions 206 or 208 and an input to controller 102 for actuator 108B when moved in directions 210 or 212. In a further embodiment, joystick 200 may be moved diagonally to provide inputs for both actuators 108A and 108B at the same time.

In operation an operator 50 holds base member 202 in his or her hand 52. The operator 50 moves hand 52 to impart a movement to joystick 200 in one or more of directions 206, 208, 210, and 212. While the operator is holding base member 202, operator 50 is able to adjust the setting of operator input device 122, illustratively shown as a thumb wheel 220. Illustratively, thumb wheel 220 is adjusted with a thumb 54 of operator 50. Thumb wheel 220 is rotated generally in directions 210 and 212.

In one embodiment, thumb wheel 220 provides at least two discrete settings, each setting providing a respective gain input to controller 102. In one example, a detent (not shown) is provided to indicate the placement of thumb wheel 220 in a particular setting. In another embodiment, thumb wheel 220 is a variable switch and provides a variable gain input to controller 102. In this embodiment, thumb wheel 220 provides infinite variability. In one example, thumb wheel 220 controls a variable resistance, such as a potentiometer. Other exemplary operator input devices include a rotatable knob, a second joystick, or other suitable rotatable operator input devices.

Joystick 200 further includes a boot 222 to permit the relative movement between base member 202 and a base (not shown) and to minimize the entry of contaminants into joystick 200. Further, joystick 200 may include one or more buttons 224 and 226 to control additional functions of equipment 100. In one embodiment, one of buttons 224 and 226 acts as a second operator input device 122 and provides the ability to select between two ranges of metering rates for valve 110A, such as a normal range of metering rates and a precision range of metering rates.

In one embodiment, a first joystick 200 and a second joystick 200 are provided. First joystick 200 is configured to control the swing of the boom arm 22 when moved in directions 206 and 208 and to control the raising and lowering of the boom arm 22 when moved in directions 210 and 212. Second joystick 200 is configured to control the raising and lowering of the dipperstick arm 24 when moved in directions 206 and 208 and to control the movement of bucket 26 when moved in directions 210 and 212.

Figure 5:
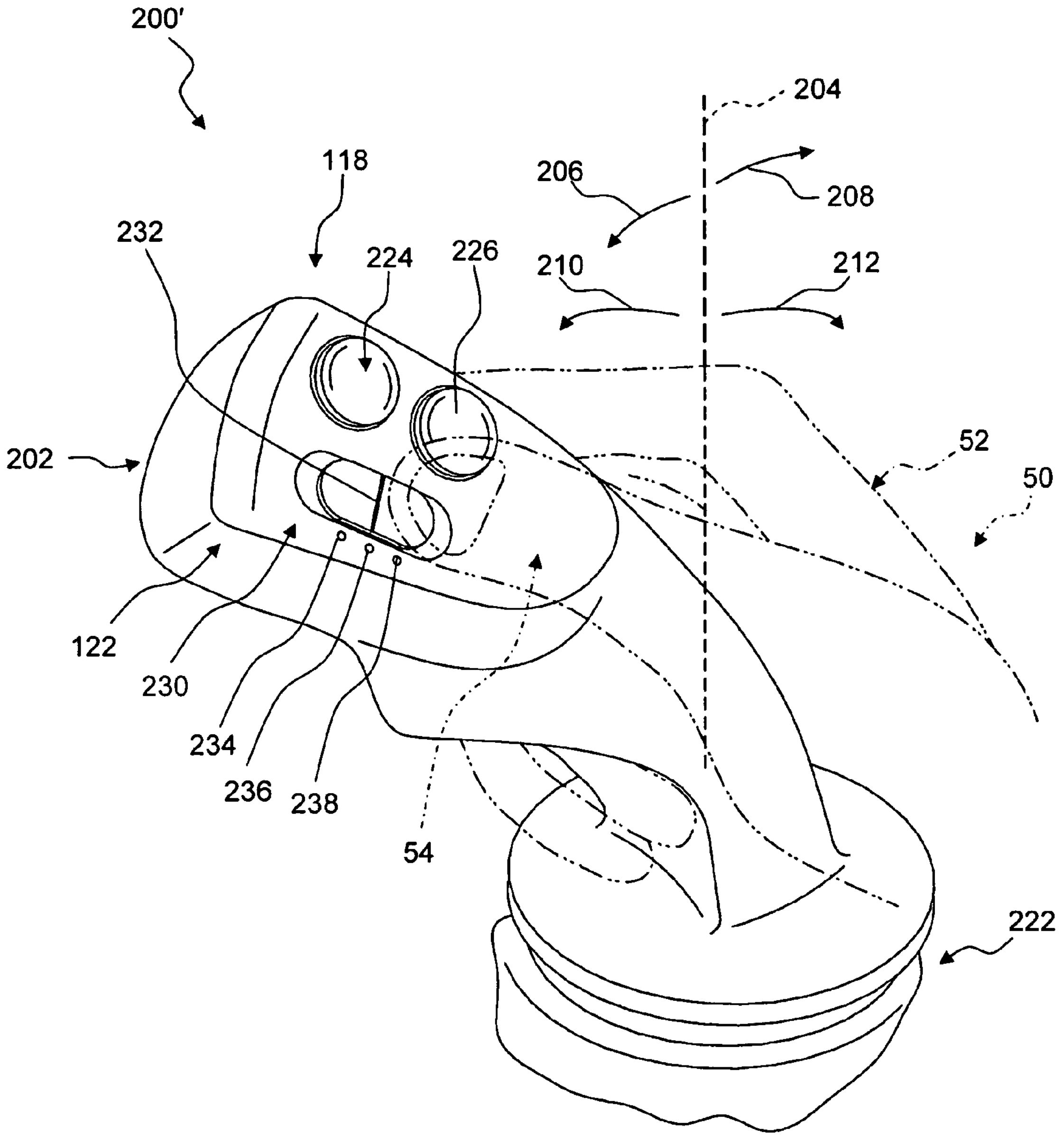
FIG. 5 is a perspective view of a second exemplary operator input device being held by a hand of the operator, the second exemplary operator input device including a translational metering gain operator input device.

Referring to FIG. 5, a modified joystick 200' is shown. Joystick 200' is generally the same as joystick 200 except that thumb wheel 220 has been replaced with a translational switch 230. The position of switch 230 is adjusted by thumb 54 of operator 50 to select a given range of metering rates. As illustratively shown, an indicia 232 on switch 230 is aligned with an indicia 236 on base member 202 indicating to the operator that a range of metering rates associated with indicia 236 is currently selected. Illustratively, operator 50 is able to select one of three different ranges of metering rates, a first range of metering rates corresponding to indicia 234, a second range of metering rates corresponding to indicia 236, and a third range of metering rates corresponding to indicia 238.

As illustrated in FIGS. 4 and 5, second operator input device 122 (illustratively thumb wheel 220 and switch 230) is coupled to first operator input device 118 (illustratively base member 202 of joystick 200). However, second operator input device 122 may be spaced apart from first operator input device 118. Referring to FIG. 6, second operator input device 122 is illustratively shown as a switch 250 located on floor 48 of operator compartment 46. Switch 250 is depressible in direction 252 to toggle between at least two ranges of metering rates, such as between a normal range of metering rates and a precision range of metering rates. In another embodiment, switch 250 or other floor mounted operator input device is a variable switch and provides a variable gain input, such as a foot pedal.

Also shown in FIG. 6 are a plurality of operator input devices 118, illustratively control levers 252A, 252B, and 252C and foot pedals 254A and 254B. In one embodiment, control lever 252A is moveable in direction 256A to dump bucket 26 and in direction 256B to load bucket 26, control lever 252B is moveable in direction 258A to raise dipperstick arm 24 and in direction 258B to lower dipperstick arm 24, control lever 252C is moveable in direction 260A lower boom arm 22 and in direction 260B to raise boom arm 22. Further, foot pedal 254A is depressible in direction 252 to swing boom arm 22 to the left relative to the operator and foot pedal 254B is depressible in direction 252 to swing boom arm 22 to the right relative to the operator.

Even though switch 250 is spaced apart from control levers 252A, 252B, 252C, operator 50 may still adjust switch 250 while maintaining his/her hold on a first control lever 252A with a first hand and/or on a second control lever 252B with a second hand. As such, an operator may operate a first inputs 252A and 252B and change the range of metering rates on the fly with switch 250.

Although the invention has been described in detail with reference to certain preferred embodiments, variations and modifications exist within the spirit and scope of the invention as described and defined in the following claims.

The invention claimed is:

1. A vehicle comprising:

a frame;

a plurality of traction devices configured to propel the frame on the ground;

an output device coupled to the frame, the output device configured to be moveable between a first position and a second position;

a hydraulic actuator coupled to the output device to move the output device between the first position and the second position; and a hydraulic control system coupled to the hydraulic actuator and configured to provide hydraulic fluid to the hydraulic actuator, the hydraulic control system including a base member having a range of travel, the range of travel corresponding to a range of metering rates of hydraulic fluid to the hydraulic actuator; and an input device supported by the base member and being adjustable by an operator while the operator holds the base member, the input device having a first position which corresponds to the range of metering rates being set to a first range of metering rates and a second position which corresponds to the range of metering rates being set to a second range of metering rates, the second range of metering rates being greater than the first range of metering rates.

2. The vehicle of claim 1, wherein a lower extent of both the first range of metering rates and the second range of metering rates is zero and corresponds to the base member being in a default position.

3. The vehicle of claim 2, wherein the first range of metering rates provides a first resolution of metering rates used for a precision operation with the output device and the second range of metering rates provides a second resolution of metering rates used for a normal operation with the output device.

4. The vehicle of claim 3, wherein a first upper extent of the first range of metering rates is about 50 percent a second upper extent of the second range of metering rates.

5. The vehicle of claim 1, wherein the input device has a third position which corresponds to a third range of metering rates, the third range of metering rates provides a third resolution of metering rates used for a gross operation with the output device.

6. The vehicle of claim 5, wherein a third upper extent of the third range of metering rates is about 110 percent to about 130 percent the second upper extent of the second range of metering rates.

7. The vehicle of claim 1, wherein the input device provides an infinitely adjustable range of metering rates.

8. The vehicle of claim 7, wherein the base member controls the hydraulic actuator when moved in the first direction and controls a second hydraulic actuator when moved in a second direction.

9. The vehicle of claim 1, wherein the base member is a joystick.

10. The vehicle of claim 1, wherein the base member is a lever.

11. The vehicle of claim 1, wherein the input device is a rotatable switch rotatably coupled to the base member.

12. The vehicle of claim 1, wherein the input device is a translational switch coupled to the base member.

13. The vehicle of claim 1, wherein the input device is adjustable by a first hand of an operator while the operator holds the base member with the first hand.

14. The vehicle of claim 1, wherein the input device is directly coupled to the base member.

15. A vehicle comprising:

a frame;

a plurality of traction devices configured to propel the frame on the ground;

an output device coupled to the frame, the output device being configured to perform a first function and to perform a second function;

a first hydraulic actuator coupled to the output device to move the output device during the performance of the first function;

a second hydraulic actuator coupled to the output device to move the output during the performance of the second function; and a hydraulic control system coupled to the first hydraulic actuator and the second hydraulic actuator and configured to provide hydraulic fluid to the first hydraulic actuator and the second hydraulic actuator, the hydraulic control system including a first user input device configured to be held by a first hand of the operator and to control the first function of the output device, the first user input having a first range of metering rates;

a second user input device configured to be held by a second hand of the operator and to control the second function of the output device, the second user input device having a second range of metering rates; and a third user input device positioned to be adjustable by the operator while the operator holds the first user input device and the second user input device, the third user input device being configured to adjust at least one of the first range of metering rates and the second range of metering rates.

16. The vehicle of claim 15, wherein the third user input device is configured to adjust both the first range of metering rates and the second range of metering rates.

17. The vehicle of claim 15, wherein the third user input device is spaced apart from the first user input device and the second user input device.

18. The vehicle of claim 17, wherein the third user input device is adjustable by a foot of the operator.

19. The vehicle of claim 18, further comprising an operator compartment having a floor, the third user input device being coupled to the floor.

20. The vehicle of claim 15, wherein the third user input device is coupled to the first user input device and is adjustable by the first hand of the operator while the first hand holds the first user input device.

21. The vehicle of claim 15, wherein the third user input device is a switch having a plurality of discrete settings.

22. The vehicle of claim 21, wherein the switch has a first setting corresponding to a normal resolution of the at least one of the first range of metering rates and the second range of metering rates and a second setting corresponding to a precision resolution of the at least one of the first range of metering rates and the second range of metering rates.

23. The vehicle of claim 22, wherein the precision resolution is about 50 percent of the normal resolution.

24. The vehicle of claim 22, wherein the switch further includes a third setting corresponding to a gross resolution of the at least one of the first range of metering rates and the second range of metering rates, wherein the gross resolution is about 110 percent to about 130 percent of the normal resolution.

25. The vehicle of claim 15, wherein the third user input device is a variable switch.

26. A method of controlling a metering rate of a hydraulic system of a vehicle which controls the operation of an output device, the method comprising the steps of:

holding a first user input device of the vehicle with a first hand to control a first function of the output device the first function having a first range of metering rates;

holding a second user input device of the vehicle with a second hand to control a second function of the output device, the second function having a second range of metering rates;

adjusting at least one of the first range of metering rates and the second range of metering rates while continuing to hold the first user input device and the second user input device; and imparting movement to at least one of the first user input device and the second user input device while adjusting at least one of the first range of metering rates and the second range of metering rates.

27. The method of claim 26, wherein the step of adjusting includes the step of adjusting a third user input device configured to adjust at least one of the first range of metering rates and the second range of metering rates with one of the first hand and the second hand.

28. The method of claim 26, wherein the step of adjusting includes the step of adjusting a third user input device configured to adjust at least one of the first range of metering rates and the second range of metering rates with a first foot.

29. A vehicle comprising:

a frame;

a plurality of traction devices configured to propel the frame on the ground;

an output device coupled to the frame, the output device configured to be moveable between a first position and a second position;

a hydraulic actuator coupled to the output device to move the output device between the first position and the second position; and a hydraulic control system coupled to the hydraulic actuator and configured to provide hydraulic fluid to the hydraulic actuator, the hydraulic control system including a plurality of first user input devices, each of the plurality of first user input devices having a default position and a range of travel from the default position, the range of travel corresponding to a range of metering rates of hydraulic fluid to the hydraulic actuator; and a second user input device having a first position and a second position, the second user input device being supported by at least one of the plurality of first user input devices, the second user device moving with the at least one of the plurality of first user input devices along the range of travel from the default position, the second user input device being adjustable by the operator while holding the plurality of first user input devices; the control system setting the range of metering rates to a first range of metering rates corresponding to the second user input device being in the first position and setting the range of metering rates to a second range of metering rates corresponding to the second user input device being in the second position.

30. The vehicle of claim 29, wherein the first position corresponds to a precision resolution and the second position corresponds to a normal resolution.

31. The vehicle of claim 30, wherein a first upper limit of the precision resolution is about fifty percent of a second upper limit of the normal resolution.

32. The vehicle of claim 31, wherein the second user input device has a third position which corresponds to a gross resolution.

33. The vehicle of claim 32, the control system setting a third range of metering rates corresponding to the second user input device being in the third position, wherein a third upper limit of the gross resolution is about 110 to about 130 percent of the second upper limit of the normal resolution.

* * * * *